(12) United States Patent
Shvodian

(10) Patent No.: US 7,843,848 B2
(45) Date of Patent: Nov. 30, 2010

(54) METHODS AND APPARATUS FOR ROUND TRIP TIME MEASUREMENTS

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 796 days.

(21) Appl. No.: 11/589,897

(22) Filed: Oct. 31, 2006

(65) Prior Publication Data
US 2008/0101253 A1 May 1, 2008

(51) Int. Cl.
*H04L 9/32* (2006.01)
(52) U.S. Cl. .................. 370/252; 370/241; 713/150; 713/168; 726/2; 726/3; 726/4; 726/11; 726/14
(58) Field of Classification Search .......... 370/241, 370/252; 715/700, 764, 856, 862; 713/150, 713/168; 726/2–4, 11, 14
See application file for complete search history.

(56) References Cited

U.S. PATENT DOCUMENTS

| | | | |
|---|---|---|---|
| 5,734,833 A * | 3/1998 | Chiu et al. ............ 709/225 |
| 6,765,896 B1 * | 7/2004 | Ahmed et al. ............ 370/338 |
| 7,042,868 B2 | 5/2006 | Runkle et al. | |
| 7,058,414 B1 | 6/2006 | Rofheart et al. | |
| 2001/0045494 A1 * | 11/2001 | Higgins ............ 244/158 R |
| 2002/0118661 A1 * | 8/2002 | Voce ............ 370/337 |
| 2006/0135258 A1 * | 6/2006 | Maheshwari et al. ........ 463/42 |
| 2006/0291483 A1 * | 12/2006 | Sela ............ 370/401 |
| 2007/0168661 A1 * | 7/2007 | Chaney ............ 713/168 |
| 2007/0263570 A1 * | 11/2007 | Alapuranen et al. ......... 370/337 |
| 2007/0294645 A1 * | 12/2007 | Medvinsky et al. ......... 715/862 |
| 2008/0031136 A1 * | 2/2008 | Gavette et al. ............ 370/235 |

OTHER PUBLICATIONS

Standard ECMA-368, High Rate Ultra Wideband PHY and MAC Standard, Dec. 2005, pp. 53-61, 72-73.

* cited by examiner

*Primary Examiner*—William Trost, IV
*Assistant Examiner*—Charles C Jiang

(57) ABSTRACT

In a method for measuring round trip time (RTT), an RTT measurement packet is transmitted to a destination node. The RTT from transmission of the RTT measurement packet to reception of a response from the destination node is measured to determine if the RTT is greater than a predetermined time period. If the RTT is greater than the predetermined time period, an RTT measurement packet is repeatedly retransmitted at a different time interval and the RTT is remeasured until either the RTT measurement packet has been transmitted a predetermined number of times or the RTT is not greater than the predetermined time period.

17 Claims, 5 Drawing Sheets

METHODS AND APPARATUS FOR ROUND TRIP TIME MEASUREMENTS

FIELD OF THE INVENTION

The present invention relates generally to transmissions between a source node and a destination node in a network.

BACKGROUND OF THE INVENTION

A network such as, for example, an Institute of Electrical and Electronics Engineers (IEEE) 1394 or 1394-over-coax bridged network, etc., permits data content at a source node to be transmitted to a destination node. The network may be implemented in a home, office, etc., and may provide the capability of utilizing the services of a content provider disposed at the source node at a separately located content sink disposed at the destination node. The source node may be a content provider such as a digital video disc (DVD) player, set top box, D-VHS player, satellite receiver, etc. The destination node may be a content sink such as a receiver, monitor, etc. For example, an individual may have the DVD player located at one portion of a home such as the living room as the source node and a separate monitor or receiver located at another portion of the home such as that individual's bedroom as the destination node. The individual will be able to watch DVD programming from the DVD player of the living room in the individual's bedroom via the separate monitor or receiver.

The source node and the destination node are connected to each other via an apparatus or device such as, for example, a 1394 bridge, network switch, Ethernet, etc., which will be referred to generally as a network bridge. Particularly, the source node may be connected to a first bridge and the destination node may be connected to a second bridge via an existing cable infrastructure. The media access control (MAC) layer of the first and second bridges can adopt time division multiple access (TDMA) for exchanging data in which a superframe is generated for transmitting and receiving data as in an IEEE 802.15.3 MAC layer.

In accordance with the demands of contents providers, many high quality digital devices such as DVD and HDTV devices use a digital transmission content protection (DTCP) standard such as DTCP-1394 or DTCP Internet Protocol (DTCP-IP) for digital rights management. Particularly, the DTCP standard provides for an authentication process to ensure that the content is being sent to a trusted device. In addition, many content owners require verification of localization between the source node and the destination node to ensure that the content is being distributed at the intended source or network rather than at a remote location or being broadcast. DTCP-IP provides localization by setting a maximum number of routers or switches along a packet path (hop count) and by requiring a 7 ms measurement from transmission of a packet from a source node to reception of a reply packet from the destination node, which will be referred to as round trip time (RTT) measurement, for standard definition content. A 2 ms RTT measurement may be required in the future for high definition content. Presently, DTCP-1394 has not required localization because, for example, the 1394 cables have limited length and it has not been possible to connect 1394 cable over the internet.

However, as mentioned above, the MAC layer uses TDMA-based superframes for exchanging data. The TDMA-based superframe may have a length of up to 65 ms, with only certain slots allocated for providing communication from the source node to the destination node and for providing communication from the destination node to the source node. Therefore, there will be latency from the time a packet arrives at a superframe to the time that it is transmitted over a particular slot to the destination node and from the time a response arrives at a superframe to the time it is transmitted over a particular slot to the source node. That is, the inherent nature of the TDMA-based superframe may render it difficult to achieve the minimum round trip time required by the content at the source node, thereby preventing verification of localization between the source node and the destination node.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

The apparatus and methods described below are applicable to any wired or wireless communication network elements. Exemplary networks include an Institute of Electrical and Electronics Engineers (IEEE) 802.15 protocol-based Personal Area Network (PAN), an IEEE 802.16 protocol-based Metropolitan Area Network, etc. However, the apparatus and methods are also applicable to numerous other communication network types. The communication network is generally a slot-based network such as, for example, a time division multiple access (TDMA)-based network or other networks that include TDMA aspects.

Figure 1:
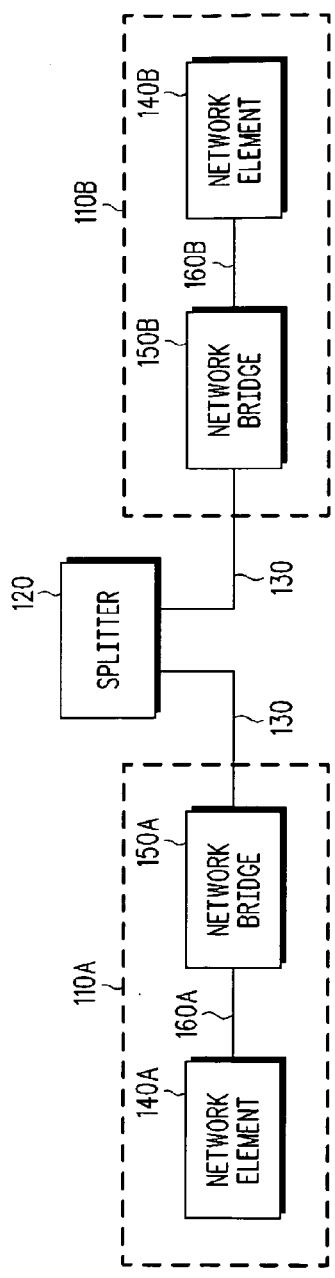
FIG. 1 is a block diagram illustrating a bridging network according to a disclosed embodiment.

Referring to FIG. 1, an exemplary bridging network 100 in which various embodiments may be implemented will be discussed. The bridging network 100 includes a plurality of sub-networks 110A, 110B (first and second sub-networks) that are connected to a splitter 120 by a first communication medium 130. Although only two sub-networks 110A, 110B are shown, it should be appreciated that there may be many more sub-networks connected to the splitter 120. The first communication medium 130 may be, for example, a wired connection such as, for example, IEEE 1394 cable or universal serial bus (USB) cable, Ethernet network, or a wireless connection such as, for example, IEEE 802.15.3/3b, Wi-Fi, or Bluetooth. The splitter 120 can be an active or passive splitter such as a coaxial splitter.

Each of the sub-networks 110A, 110B includes a network element 140A, 140B and an apparatus such as, for example, a 1394-over-coax bridge, a router, or a wireless access point which will be referred to here generally as a network bridge 150A, 150B. The network elements 140A, 140B may be any device such as, for example, a digital video disc player (DVD) player, audio video hard drive, set top box, D-VHS player, DVD recorder, high-definition television (HDTV) television, stereo, computing device, receiver, etc. Further, although one network element 140A, 140B is shown within each of the sub-networks 110A, 110B, it should be appreciated that there may be a plurality of network elements within each sub-network 110A, 110B connected to a respective network bridge 150A, 150B.

Each of the network bridges 150A, 150B and the network elements 140A, 140B are connected together within each of the sub-networks 110A, 110B by a second communication medium 160A, 160B. The second communication medium 160A, 160B may also be a wired connection such as, for example, 1394 cable, USB cable or Ethernet cable/network, or a wireless connection such as, for example, IEEE 802.15.3/3b, Wi-Fi, or Bluetooth.

Figure 2:
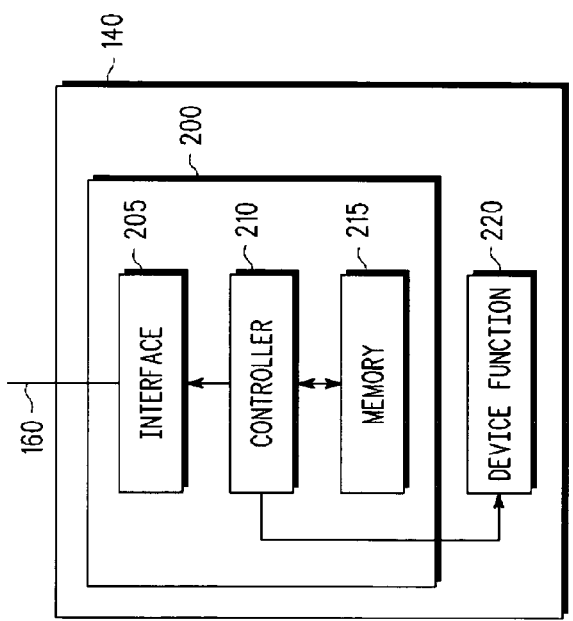
FIG. 2 is a block diagram of an exemplary apparatus implemented at a source device for transmitting measurement packets over the network according to a disclosed embodiment.

Referring to FIG. 2, the network elements 140A, 140B (referred to here generally by 140) will be discussed in more detail. The network elements 140, which as mentioned above, may be, for example, a digital video disc player (DVD) player, audio video hard drive, set top box, D-VHS player, DVD recorder, high-definition television (HDTV) television, stereo, computing device, receiver, etc. shown generally as device function 220, includes an apparatus 200 for periodically sending a measurement packet to a network element serving as a content sink at a destination node and receiving a response from the destination node to authenticate and test the localization of the network element. The apparatus 200 can be further configured to receive the measurement packet from the network element 140 serving as a content source. The apparatus 200 may be incorporated within the network element 140 or it may be a separate entity attached thereto. The apparatus 200 includes an interface 205, a controller 210 and a memory 215. The interface 205 may be, for example, a USB connector circuit and USB software, a 1394 cable interface, Ethernet cable/network interface, Wi-Fi interface, or Bluetooth interface. Generally, the configuration of the interface 205 will depend on the second communication medium 160. The controller 210 can be one of a variety of different processors including general purpose processors, custom processors, controllers, compact eight-bit processors or the like. The memory 215 can be one or a combination of a variety of types of memory such as random access memory (RAM), read only memory (ROM), flash memory, dynamic RAM (DRAM) or the like. Further, the memory 215 can include instructions such as computer programs which can be used for configuring the controller 210 to control the operation of the apparatus 200.

The controller 210 is configured to transmit a round trip time (RTT) measurement packet to a network element at the destination node via the interface 205 and to measure a RTT from transmission of the RTT measurement packet to reception of a response from the destination node to determine if the RTT is greater than a predetermined time period such as, for example, 2 ms or 7 ms. If the RTT is greater than the predetermined time period, the controller 210 repeatedly retransmits the RTT measurement packet at a different timing and remeasures the RTT until either the RTT measurement packet has been transmitted a predetermined number of times or the RTT is not greater than the predetermined time period in order to accurately measure the RTT. The controller 210 may further be configured to send the RTT measurement packets during an off-peak period of low network usage. The controller 210 can also mark the RTT measurement packet as high priority data so that the RTT measurement packet is sent ahead of other traffic.

The controller 210 is further configured to encode a challenge such as a cryptographic challenge in the RTT measurement packet and to decode an answer to the challenge from the destination node encoded in the response. The controller 210 is further configured to authenticate the network element at the destination node to thereby permit delivery of predetermined data to the destination node if one of the measured RTTs is less than a predetermined time period and the answer to the challenge is correct. The controller 210 is further configured to determine that the network element at the destination node cannot be authenticated if no measured RTT is less than the predetermined time period after transmitting a predetermined number of the RTT packets or if the answer to the challenge is not correct. By performing such an authentication, the controller 210 can prove that the network element that responds to the challenge is within the network and is truly the device that will be cryptographically enabled to display the content rather than another device.

Figure 3:
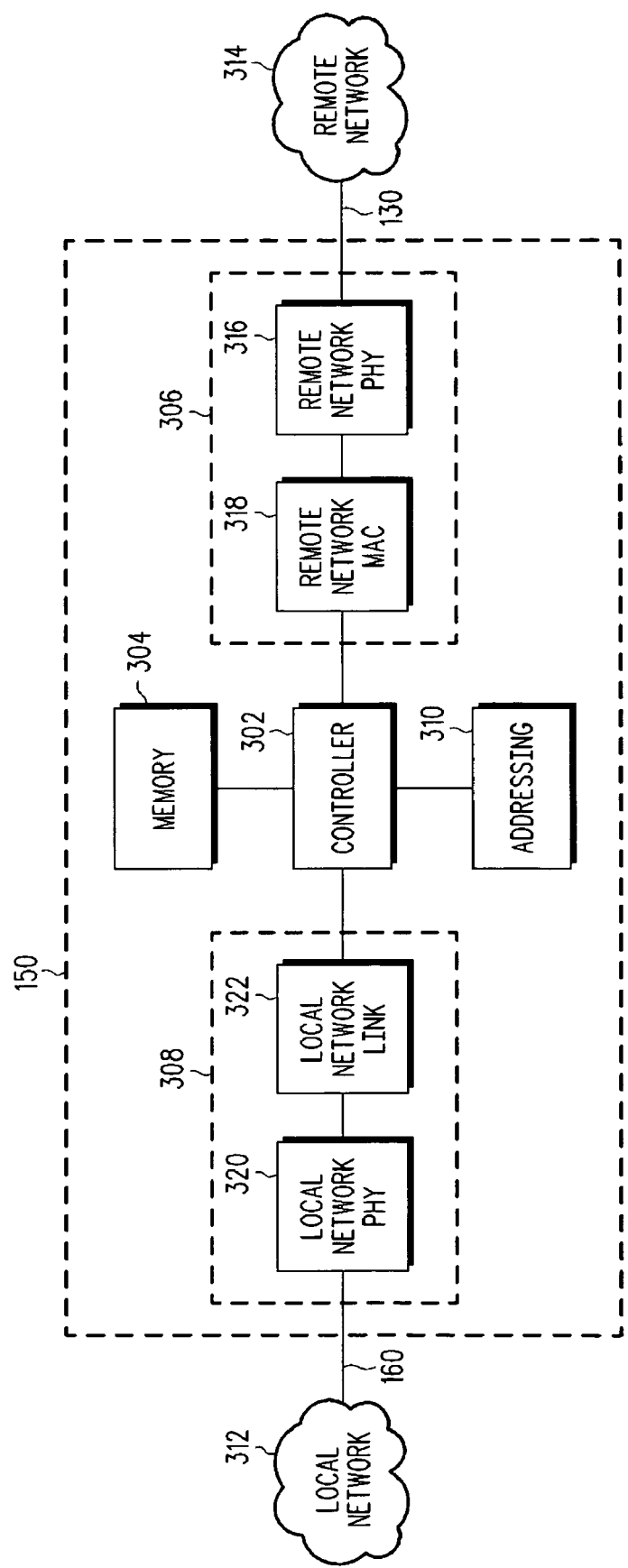
FIG. 3 is a block diagram of an exemplary network bridge according to a disclosed embodiment.

Referring to FIG. 3, an exemplary network bridge 150 for implementing the network bridges 150A, 150B will be discussed in more detail. The network bridge 150 includes a controller 302, a memory 304, a first interface 306, a second interface 308 and control circuitry for addressing 310. The controller 302 can be one of a variety of different processors including general purpose processors, custom processors, controllers, compact eight-bit processors or the like. The controller 302 is generally for executing instructions stored in the memory 304 to control the first and second interfaces 306, 308 and the addressing unit 310. The memory 304 can be one or a combination of a variety of types of memory such as RAM, ROM, flash memory, DRAM or the like. The addressing unit 310 is for address related tasks to ensure proper data delivery.

The first interface 306 is for interfacing with the remote network elements, which are shown as a remote network 314, via the splitter 120 over the first communication medium 130. The first communication medium 130 may be standard coax.

In such a case, the splitter 120 can be a coax splitter and the first interface 306 of the network bridge 150 can also include, for example, a physical layer device (PHY) 316 and an IEEE 802.15.3/3b protocol-based (hereafter "802.15.3") media access control (MAC) interface 318 including an ultra-wide band (UWB) transceiver for sending IEEE 1394 UWB signals over the coaxial cable 130 thru the coax splitter as the splitter 120. The MAC interface 318 can, for example, generate a superframe as defined by the IEEE 802.15.3/3b protocol composed of a beacon containing control information, a contention access period (CAP) for transmitting data and a channel time allocation period for transmitting data. It should be noted that the first interface 306 is not limited to including an 802.15.3 MAC interface 318 or the PHY 316. The configuration of the first interface 306 can depend upon the type of the first communication medium 130. Further, the MAC interface 318 can be a link layer element or the PHY can be an element of a different layer.

The second interface 308 is for interfacing with network elements local to the network router 150 which are depicted generally here as a local network 312. The local network 312 may include, for example, the DVD player, HDTV television, stereo, computing device, receiver, etc. discussed above connected with the second interface 306 via the second communication medium 160. As those skilled in the art should appreciate, the second interface 308 can include certain physical layer 320 and link layer 322 elements depending on the type of the second communication medium 160. For example, if the second communication medium 160 is 1394 cable, then the physical layer 320 and link layer 322 can both be an IEEE standard 1394 S400 PHY along with a link layer interface for delivering high-quality, real-time, digital multimedia content at high data rates over the 1394 cable with DTCP content protection. If the second communication medium 160 is wireless, then the physical layer may be a UWB transceiver. Further, in alternative embodiments, the physical layer 320 could be a link layer element and the link layer 322 could be a MAC.

The controller 302 is configured to control the second interface 308 to receive RTT measurement packets from the local network 312. The controller 302 is further configured to assign a bi-directional slot within the superframe for forwarding the RTT measurement packets to a destination node at the remote network 314. The bi-directional slot should be as long as possible; however, it should at least have a length as long as the predetermined time period required for the RTT. The controller 302 can assign the bi-directional slot by taking advantages of mechanisms such as implied acknowledgement (ACK), piggyback ACK, relinquish, polling and carrier sense multiple access with collision avoidance (CSMA/CA) included within, for example, the IEEE 802.15.3/3b protocol-based MAC interface 318. The controller 302 is configured to control the first interface 306 to forward the RTT measurement packets with minimal latency to a destination node at the remote network 314 over the superframe. The controller 302 may optionally mark the RTT measurement packet as high priority data so that the RTT measurement packet is sent ahead of other traffic.

The controller 302 can be further configured to assign a bi-directional channel time allocation slot within the superframe to have a length at least as long as the predetermined time period prior to the transmitting of the RTT measurement packet. The bi-directional channel time allocation slot may be assigned according to a mechanism stored in the memory 304 such as implied acknowledgement (ACK), relinquish, polling and carrier sense multiple access with collision avoidance (CSMA/CA).

Figure 4A:
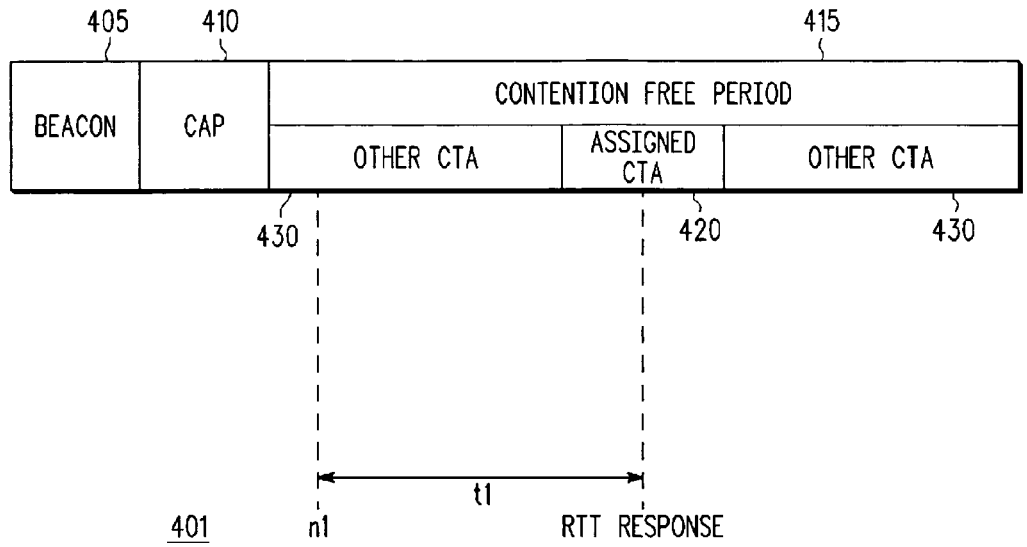
FIGS. 4A-4D are illustration of exemplary superframes generated according to disclosed embodiments.
Figure 4B:
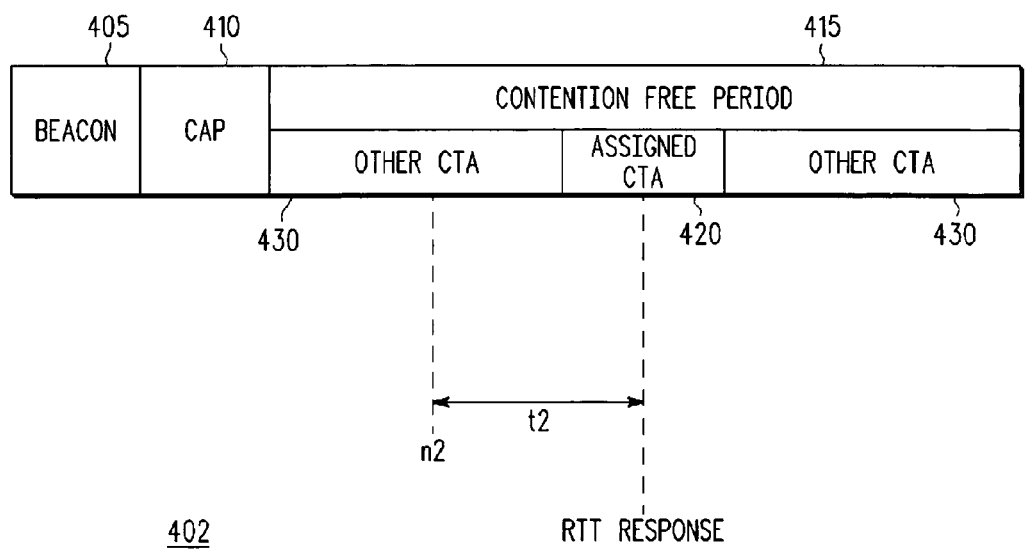

Referring to FIGS. 4A-4B, exemplary superframes will be discussed. As discussed above, the network 100 can be a TDMA-based network. Accordingly, the MAC interface 318 of the network bridge 150 can use TDMA for exchanging data. Particularly, the MAC interface 318 can generate the superframes 401, 402, 403, 404 that generally includes a beacon 405 for including control information, a contention access period (CAP) 410 for transmitting data through backoff, and a contention free access period 415 in which data can be transmitted within allocated time slots.

The MAC interface 318 receives a first RTT measurement packet $n_1$ from a network element at a source node for localization of a network element at the destination node. The controller 302 will control the MAC interface 318 to forward or transmit the RTT measurement packet within an allocated time slot of the superframe 401 to the destination node. Particularly, first the MAC interface 318 can allocate a bi-directional channel time allocation (CTA) slot 420 within the contention free access period 415 of the superframe 401 for transmission to and reception from the destination node over the first communication medium 130. The MAC interface 318 subsequently transmits the measurement packet $n_1$ to the destination node over the bi-directional CTA slot 420 of the superframe 401. However, as shown in FIG. 4A, the measurement packet $n_1$ arrives at the superframe 401 during a CTA allocated for other purposes (other CTA) 430 rather than during the bi-directional CTA slot 420. Therefore, the measurement packet waits at the superframe and is not transmitted until the timing of the bi-directional CTA slot 420. As a result, the total RTT $t_1$ including the response is greater than the required RTT for digital rights management set by the network element at the source node.

Figure 4C:
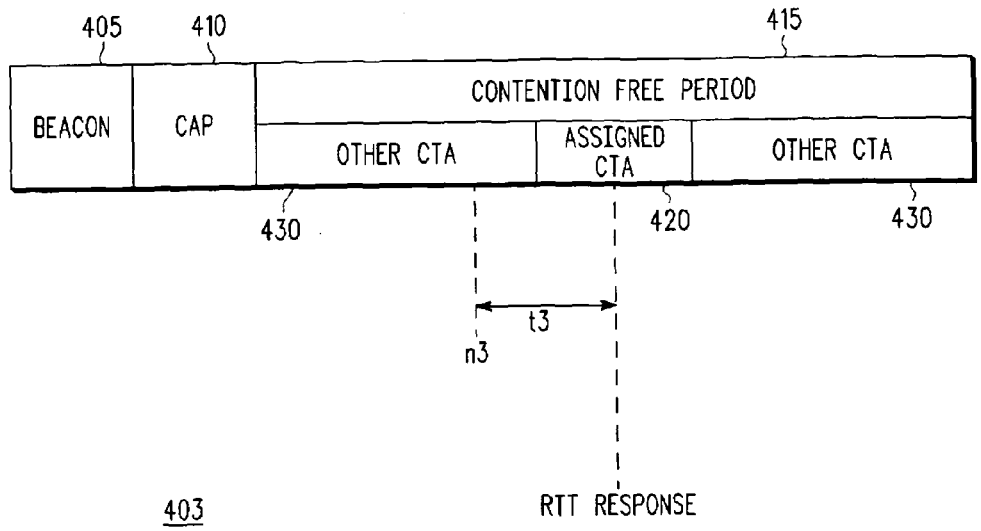

As shown in FIG. 4B, the network element at the source node then retransmits the measurement packet $n_2$ after a time interval from time of transmission of the first RTT measurement packet $n_1$, which the MAC interface 318 then transmits over a different superframe 402. Because the RTT measurement packet $n_2$ also arrives at the superframe 402 during the other CTA 430, the total RTT $t_2$ including the response is also greater than the required RTT for digital rights management. As shown in FIG. 4C, the network element then transmits another RTT measurement packet $n_3$ at after a time interval from time of transmission of RTT measurement packet $n_2$, which the MAC interface 318 then transmits over a different superframe 403. By way of example, the time interval between the transmission of the RTT measurement packet $n_3$ and measurement packet $n_2$ may be different from the time interval between the transmission of the RTT measurement packet $n_2$ and measurement packet $n_1$. Because the RTT measurement packet $n_3$ also arrives at the superframe 403 during the other CTA 430, the total RTT $t_3$ including the response may also be greater than the required RTT for digital rights management.

Figure 4D:
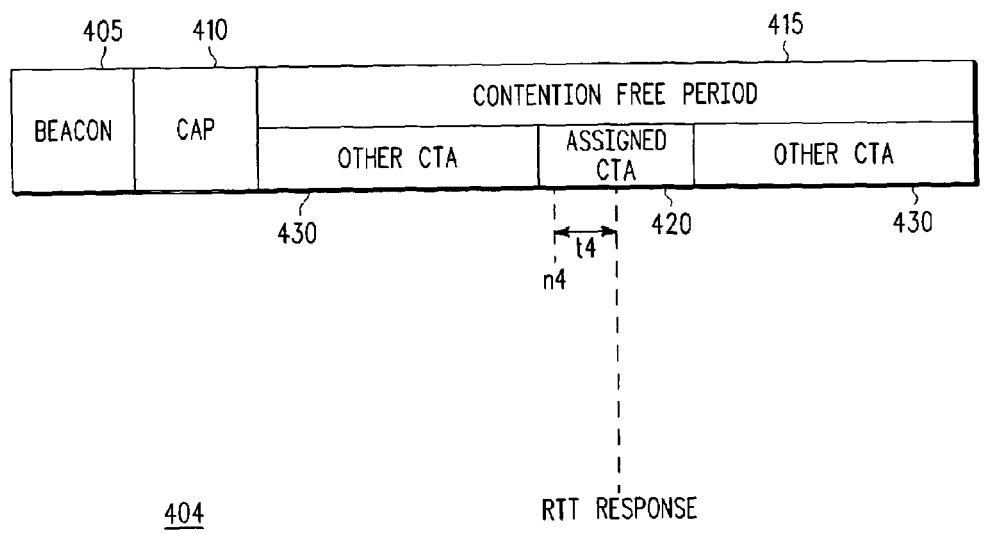

As shown in FIG. 4D, the network element at the source node then retransmits the measurement packet $n_4$ at a time interval from time of transmission of the RTT measurement packet $n_3$ which the MAC interface 318 then transmits over a different superframe 404. The time interval between the transmission of the RTT measurement packet $n_4$ and measurement packet $n_3$ may be different from the time interval between the transmission of the RTT measurement packet $n_3$ and measurement packet $n_2$. The RTT measurement packet $n_4$ arrives at the superframe 404 during the assigned CTA 420 and a response is received during the assigned CTA 420. The RTT $t_4$ including the response may be less than the required RTT for digital rights management. By waiting a different time interval from the previous transmission of the RTT measurement packet, the RTT measurement packet can eventually be transmitted over and a response received over the bi-directional CTA slot within the required RTT. The network element at the source node can then authenticate and verify localization of the network element at the destination node to thereby permit delivery of predetermined data to the destination node.

Authenticating may be performed by, for example, including a cryptographic challenge encoded within the measurement packet. The response from the network element at the destination node can include an answer to the challenge encoded therein. The network element at the source node can then decode the response to determine if the destination node has answered the response correctly.

Figure 5:
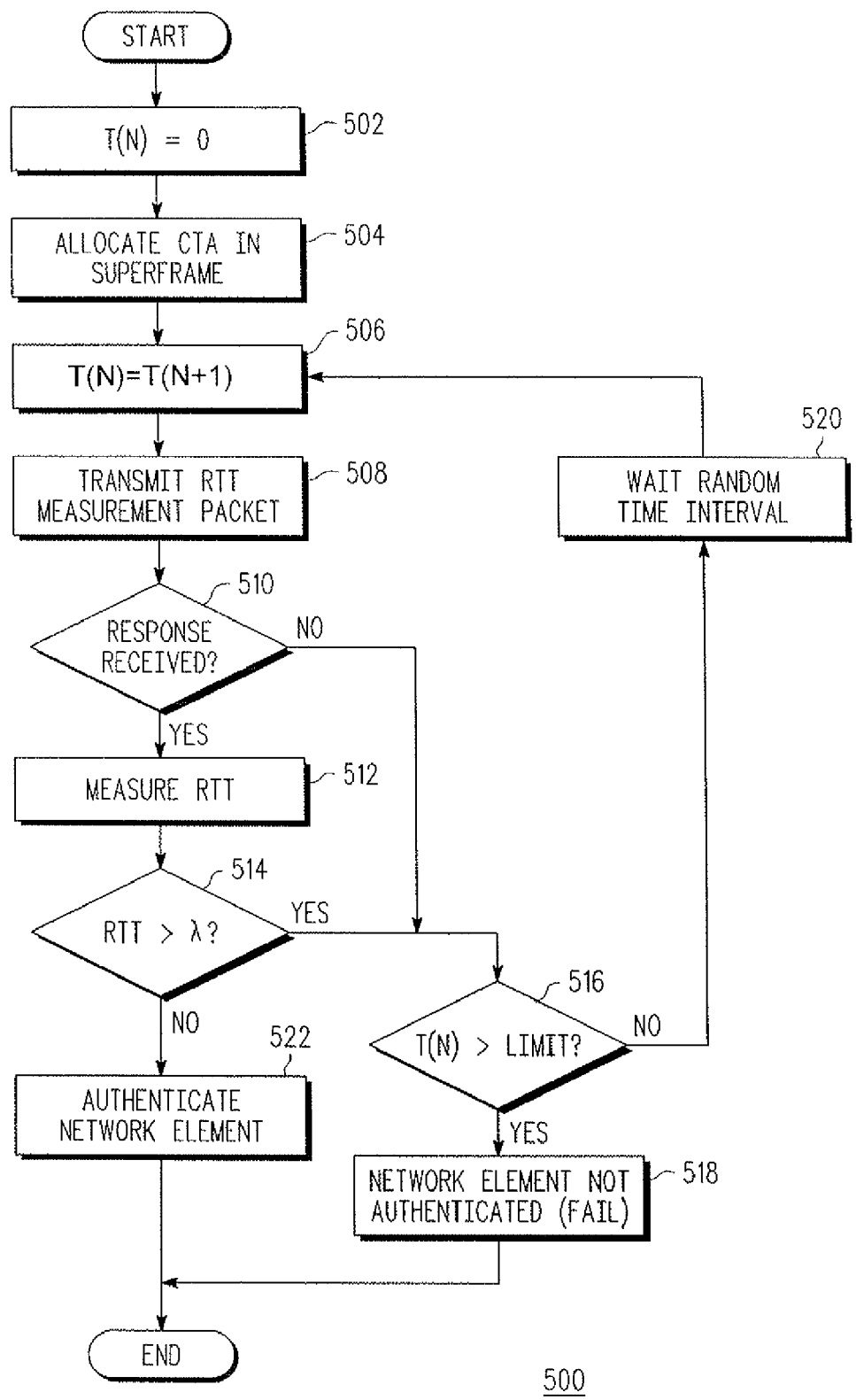
FIG. 5 is a flow chart of an exemplary methodology according to disclosed embodiments.

Referring to FIG. 5, a method 500 of operation of the apparatus 200, the network elements 140A, 140B and the network bridges 150A, 150B within the network 100 will be discussed with respect to an example in which the network element 140A is a content source that attempts to test localization of and authenticate the network element 140B as the content sink. For simplicity, in this discussion the network element 140A will be referred to as a source node and the network element 140B will be referred to as a destination node.

At 502, the source node 140A can initiate a counter T(N) for counting the number of transmissions of the RTT transmissions to zero. It should be noted that other means for counting can be used rather than the specific use of the counter T(N). At 504, the network bridge 150 assigns a bi-directional slot within a superframe at least as long as the predetermined time period required for RTT by the source node 140A. If the network is an IEEE 802.15.3 protocol-based network, the TDMA slot may be, for example, a CTA slot within the contention free period. An IEEE 802.15.3 protocol-based mechanism may be utilized to assign the bi-directional channel time allocation slot within the superframe. The mechanism may be, for example, ACK, relinquish, polling and CSMA/CA.

At 506, the source node 140A increments the counter T(N) and at 508 the source node 140A transmits an RTT measurement packet to the destination node via the network bridges 150A, 150B. The measurement packet may include a cryptographic challenge encoded therein for authenticating the destination node. If the first communication medium is 1394 bridged over coax, the network bridge 150A can transmit the RTT measurement packet on the coax by, for example, mapping an IEEE 802.15.3 protocol data stream to an IEEE 1394 channel. Further, the source node 140A may mark the RTT measurement packet as high priority data so that the RTT measurement packet is sent ahead of other traffic.

If, at 510, the source node 140A receives a response from the network element at the destination node 140B within a maximum time (YES at 510), then at 512 the source node measures the RTT from transmission of the RTT measurement packet to reception of the response.

At 514, the network bridge determines if the RTT is greater than a predetermined latency. The predetermined latency is equal to the predetermined time period set by the source node for authentication. If, at 514, the source node 140A determines that the RTT is greater than the predetermined latency λ, (YES at 514), or if, at 510, the source node 140A does not receive a response from the destination node within the maximum time (NO at 510), then at 516 the source node 140A determines if the counter T(N) is greater than a predetermined limit. That is, the source node 140A determines if the RTT measurement packet has been transmitted a predetermined number of times. If, at 516, the source node 140A determines that the counter T(N) is greater than a predetermined limit (YES at 516), then at 518 the source node 140A determines that the network element at the destination node cannot be authenticated by the network element at the source node and the process ends. That is, the source node does not authenticate the network element at the destination node if no measured RTT is less than the predetermined time period after transmitting a predetermined number of the RTT measurement packets. The predetermined time period set by the network element 140 may be, for example, approximately 2 ms in accordance with the proposed DTCP standards for ensuring localization of high definition content or, for example, approximately 7 ms for standard definition content.

If, at 516, the source node determines that the counter T(N) is not greater than a predetermined limit (NO at 516), then at 520 the source node waits a random time interval, and then increments the counter at 506 and retransmits the measurement packet at 508. If, at 514, the source node determines that the RTT is not greater than a predetermined latency λ, (NO at 514), then at 522 the source node determines that the destination node is local and can be authenticated. The source node can decode the response to determine if the answer encoded in the response is correct. Therefore, the network bridge 150 can permit delivery of predetermined data to the destination node if one of the measured RTTs is less than a predetermined time period and the answer to the challenge is correct.

That is, if the RTT is greater than the predetermined time period (YES at 514), the source node 140A repeatedly retransmits the RTT measurement packet at a different time interval and remeasures the RTT until either the RTT measurement packet has been transmitted a predetermined number of times (T(N)>LIMIT) or the RTT is not greater than the predetermined time period. The time interval waited at 520 does not have to be randomly chosen. However, the time interval between successive transmissions should be different in order to increase the probability that the RTT measurement packet will arrive at the superframe during or close to the assigned bi-directional slot.

Therefore, according to the exemplary embodiment, a network element serving as a content source in a TDMA-based network can determine if a network element serving as a content sink is localized to the network and can also authenticate the network element. The content source can send the RTT measurement packets periodically, such as during an off-peak period, to permit the network bridge to allocate a larger bi-directional slot, thereby increasing the speed at which a measurement packet can achieve an RTT with the requisite latency.

Another approach to achieving localization is to provide a combination of round trip time measurements and ranging operations between elements within the network. That is, measuring a round trip time between the source node and the first bridge, performing ultra wide band ranging operation between the first bridge and the second bridge, measuring a round trip time between the second bridge and the destination node, and then reporting each of the round trip times and the ranging to the content source. However, this approach would require a level of trust of both the first and second bridges in order to ensure that neither bridge is attempting to deceive the content source into believing that it is in the network when an actuality it is a remote device obtaining access through, for example, a router. Further, this approach would require digital rights management certification of the bridge nodes as well as the source and destination devices. In comparison, the exemplary embodiment described above provides an end to end approach of measuring the round trip time between a destination node and source node.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of determining if a destination node in a time division multiple access (TDMA)-based network is localized within a bridging network, comprising:
    transmitting a round trip time (RTT) measurement packet to the destination node;
    measuring the RTT from transmission of the RTT measurement packet to reception of a response from the destination node to determine if the RTT is greater than a predetermined time period; and
    repeatedly retransmitting the RTT measurement packet after a time interval from a previous transmission and remeasuring the RTT until either the RTT measurement packet has been transmitted a predetermined number of times or the RTT is not greater than the predetermined time period, wherein each of time intervals between successive transmissions is different,
    wherein the RTT measurement packet includes a challenge to the destination node,
    wherein the response from the destination node includes an answer to the challenge from the destination node,
    further comprising authenticating the destination node to thereby permit delivery of predetermined data to the destination node if one of the measured RTTs is less than the predetermined time period and the answer to the challenge is correct.

2. The method of claim 1, further comprising assigning a bi-directional slot within a TDMA superframe so that the RTT measurement packet can be transmitted to the destination node and the response from the destination node can be received over the bi-directional slot, the bi-directional slot having a length at least as long as the predetermined time period.

3. The method of claim 1, further comprising, prior to the transmitting of the RTT measurement packet, marking the RTT measurement packet as high priority data so that the RTT measurement packet is sent ahead of other traffic.

4. The method of claim 1, wherein the transmitting of the RTT measurement packet to the destination node further includes transmitting the RTT measurement packet over an ultra-wide band (UWB) network to the destination node.

5. The method of claim 4, wherein the UWB network comprises Institute of Electrical and Electronics Engineers (IEEE) 1394 bridged over coaxial cable.

6. The method of claim 5, wherein the transmitting of the RTT measurement packet to the destination node further includes mapping an IEEE 1394 channel to an IEEE 802.15.3 protocol data stream.

7. The method of claim 1, wherein the transmitting of the RTT measurement packet to the destination node further comprises utilizing a mechanism to assign a bi-directional channel time allocation slot within a superframe, the bi-directional channel time allocation slot having a length at least as long as the predetermined time period, the mechanism comprising one of: implied acknowledgement (ACK), piggyback ACK, relinquish, polling and carrier sense multiple access with collision avoidance (CSMA/CA).

8. The method of claim 1, further comprising determining the destination node to be not authenticated if no measured RTT is less than the predetermined time period after transmitting a predetermined number of the RTT measurement packets or if the answer to the challenge is not correct.

9. The method of claim 1, wherein the RTT measurement packets are transmitted during an off-peak period.

10. The method of claim 1, wherein the predetermined time period is less than approximately 7 ms.

11. An apparatus for determining if a destination node within a time division multiple access (TDMA)-based network is localized within a bridging network, the apparatus comprising:
    a memory; and
    a controller for executing instructions stored in the memory, the controller configured to:
    encode a challenge in a round trip time (RTT) measurement packet;
    mark the RTT measurement packet as high priority data so that the RTT measurement packet is sent ahead of other traffic;
    transmit the RTT measurement packet to the destination node;
    measure a RTT from transmission of the RTT measurement packet to reception of a response from the destination node to determine if the RTT is greater than a predetermined time period, wherein the response includes an answer to the challenge from the destination node encoded in the response;
    repeatedly retransmit the RTT measurement packet at a time interval from a previous transmission and remeasure the RTT until either the RTT measurement packet has been transmitted a predetermined number of times or the RTT is not greater than the predetermined time period, wherein each of time intervals between successive transmissions is different;
    authenticate the destination node to thereby permit delivery of predetermined data to the destination node if one of the measured RTTs is less than the predetermined time period and the answer to the challenge is correct; and
    determine the destination node to be not authenticated if no measured RTT is less than the predetermined time period after transmitting the RTT measurement packet the predetermined number of times or if the answer to the challenge is not correct.

12. An apparatus for transmitting round trip time (RTT) packets received from a source node to a destination node in a bridging network, the apparatus comprising:
    a memory; and
    a controller coupled to the memory, the controller for executing instructions stored in the memory associated with the controller, the controller configured to:

assign a bi-directional slot within a time division multiple access (TDMA) superframe having a length at least as long as a predetermined time period specified by the source node;

transmit the measurement packets to the destination node over the TDMA superframe;

receive a response from the destination node, wherein the response includes an answer to the challenge from the destination node encoded in the response;

measure the RTT from transmission of one of the RTT measurement packets to reception of the response from the destination node to determine if the RTT is greater than the predetermined time period; and repeatedly retransmit the measurement packets in a subsequent TDMA superframe after a time interval from a previous transmission and remeasure the RTT until either the RTT measurement packet has been transmitted a predetermined number of times or the RTT is not greater than the predetermined time period, wherein each of time intervals between successive transmissions is different, wherein the controller is further configured to permit authentication of the destination node if one of the measurement packets is received in less than a predetermined time period.

13. The apparatus of claim 12, wherein the controller is further configured to assign the bi-directional slot according to one of: implied acknowledgement (ACK), piggyback ACK, relinquish, polling and carrier sense multiple access with collision avoidance (CSMA/CA).

14. The apparatus of claim 12, further comprising a media access control (MAC) interface controlled by the controller, the MAC interface being for setting the RTT measurement packets in the TDMA superframe.

15. The apparatus of claim 14, wherein the MAC interface includes an ultra-wide band (UWB) transceiver for transmitting the measurement packets over an Institute of Electrical and Electronics Engineers (IEEE) 1394 bridged over coaxial cable.

16. The apparatus of claim 12, wherein the controller is further configured to:
encode a challenge in each of the measurement packets; and
mark each of the measurement packets as high priority data so that the measurement packets are sent ahead of other traffic.

17. The apparatus of claim 12, wherein the controller is further configured to authenticate the destination node if the answer to the challenge is correct.

* * * * *